United States Patent Office 3,555,882
Patented Jan. 19, 1971

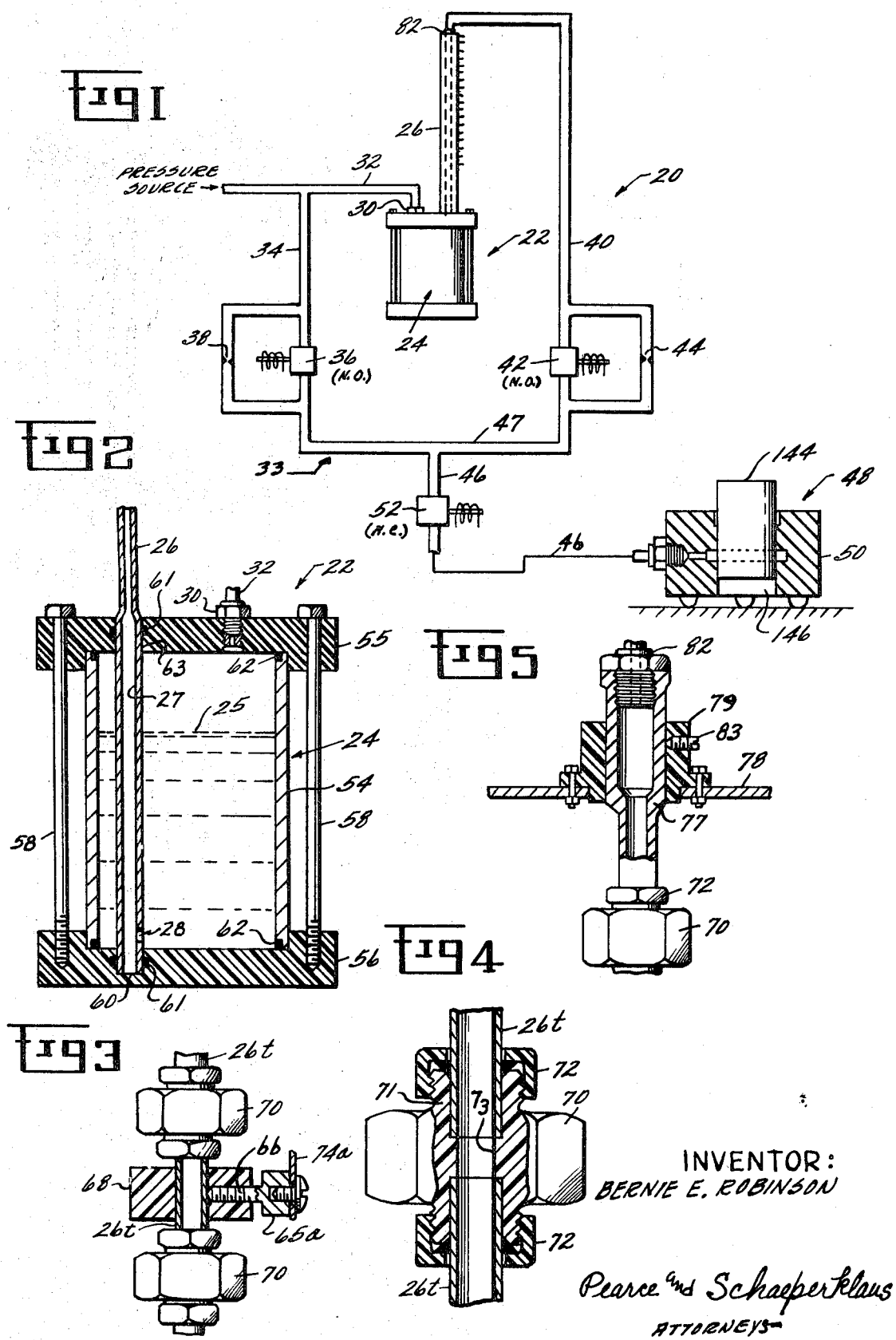

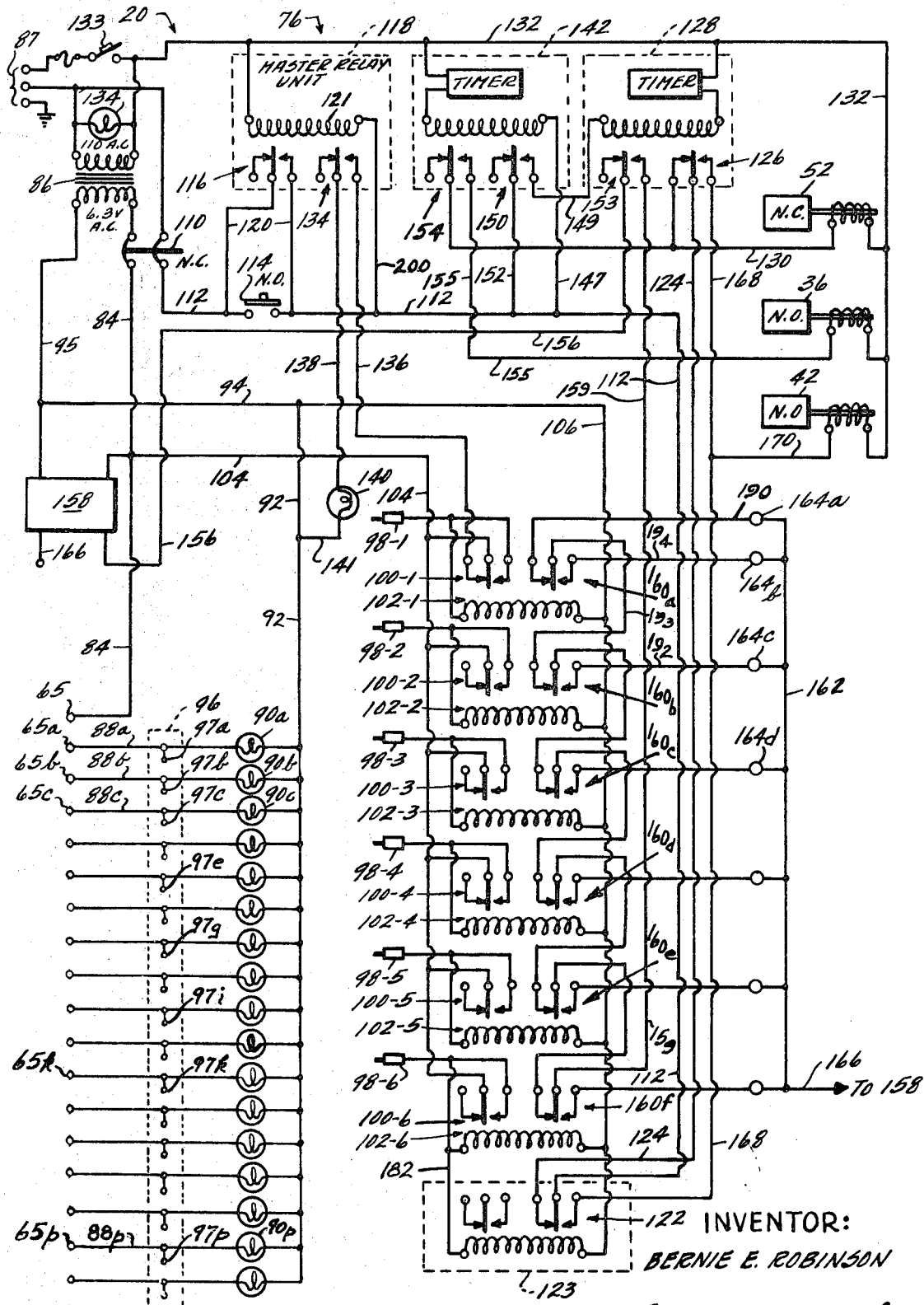

3,555,882
PNEUMATIC-ELECTRICAL FLUID GAUGING DEVICE
Bernie E. Robinson, Oak Creek, Wis., assignor to Milwaukee Valve Company, Inc., Milwaukee, Wis., a corporation of Wisconsin
Filed June 2, 1969, Ser. No. 829,669
Int. Cl. G01b 13/00
U.S. Cl. 73—37.5
40 Claims

ABSTRACT OF THE DISCLOSURE

A pneumatic-electrical air gauging device including a manometer, gauging orifice means, a pneumatic circuitry therewith and having solenoid actuated valves therein, and electrical circuitry for providing a cycle for testing wherein variation from a nominal dimension in an object is determined. The coils of the valves are actuated in accordance with circuits provided in the electrical circuitry to open and close portions of the pneumatic system at proper intervals in connection with the testing. Signalling means circuits are operatively associated with electrical connections (leg contacts) at spaced intervals along the sensing leg of the manometer for visual indication of the change in pressure occurring in the pneumatic circuit as a result of leakage at the gauging orifice means, and which indication determines such variation. Circuit means are provided for pre-setting a range of movement of the manometer liquid over a desired length of its sensing leg, and which pre-setting circuit means are operatively associated with the signalling means circuits. Cycle terminating means are provided whether or not the manometer liquid rises to a pre-set level limit. An additional timer unit is utilized for delaying actual testing of an article in order that fluid flow in the pneumatic system is continuous to the gauging orifice means before such testing begins. Means are also provided for utilizing the results of the testing, which results are in effect recorded or retained in the device, upon termination of the cycle, for a system external to the device.

BACKGROUND OF THE INVENTION

Field of the invention

The field of art to which the invention is most likely to pertain is generally located in the class of apparatus relating to air gauging devices. Class 73, Measuring and Testing, U.S. Patent Office Classification, appears to be the applicable general area of art in which the claimed subject matter of the type involved here has been classified in the past.

Description of the prior art

Air gauging devices, the art to which this invention most likely pertains, are disclosed in the following U.S. Patents: Nos. 2,589,251; 3,029,629 and 3,209,596.

SUMMARY

This invention relates to measurements by gauging devices, and in particular, is directed to a sensing device comprising a pneumatic-electrical apparatus, whereby accurate measurement of linear tolerances finer than one part in one million parts is achieved. Or, in another manner of speaking, this invention relates to an aparatus for comparing a nominal dimension of a standard article with the degree of variation from such nominal dimension in a particular article, which degree of variation is normally defined as one within or without a given tolerance.

The invention is particularly designed for the utilization of air, and the following description employs the use of air as the operating fluid, it being understood, however, that the invention is equally applicable to the use of elastic fluids other than air.

Another object of the invention is to provide for a gauging instrument or device adaptable to conventional and known fixtures without the necessity of developing new fixtures for peculiar use with such device.

An object of this invention provides for a novel combination of pneumatic and electrical circuits.

An object of this invention provides for a novel combination of pneumatic and electrical circuits to provide for sensitivity of measurement from a nominal dimension rendering the apparatus generally industrially usable.

Another object of this invention is to provide for an apparatus, the utilization of which provides for gauging a dimension to as fine or finer a tolerance as at least one part in a million parts.

A further object of the invention is to provide for a novel pneumatic-electrical gauging device which is efficient, and operable such that error in human judgment is minimized.

Another object of this invention is to provide for a novel manometer well with a manometer leg, which efficiently seals off such well from atmosphere thereby making it particularly effectively adaptable in a gauging device such as disclosed herein.

Another object of this invention is to provide for retaining or recording, electrically, audibly or otherwise, by means of novel circuitry, the results of the variation from a nominal dimension on an article, and thereby provide for utilization of such results in a system external of the device.

A further object of the invention is to provide for a stable device, one which is not prone to get out of adjustment, as in the case of other air gauging devices.

A further object of this invention is to provide for a novel electrical circuitry peculiarly constructed fgor operation with a pneumatic circuitry utilized in gauging linear variations from a nominal dimension in an article manufactured with a defined tolerance in mind.

A further object of this invention is to provide for a novel structure in a well-type manometer providing for advantageous pressure seals between its well and manometer leg.

Another object of this invention is to provide for a novel pneumatic circuit in an air gauging device.

These and other objects of the invention will become apparent upon a full and complete reading of the following description, taken together with the appended claims hereto and the drawing comprising two sheets of figures.

DESCRIPTION OF THE DRAWING

FIG. 1 is an illustration of an electrical-pneumatic gauging device embodying the invention.

FIG. 2 is an elevational view of a well-type manometer utilized in the invention.

FIG. 3 is a view, partly in cross section, of a portion of the leg of the well-type manometer shown in FIG. 2.

FIG. 4 is an enlarged view, partly in section, of a portion of the elements shown in FIG. 3.

FIG. 5 is an enlarged view of the upper extremity of the leg of the well-type manometer illustrated in FIGS. 1–4.

FIG. 6 is a schematic diagram of the electrical circuitry embodied in the invention.

DESCRIPTION OF THE PREFERRED EMBODIMENT

Referring now to the drawing in which reference characters therein correspond to like numerals in the following description, reference character 20 refers to the preferred embodiment of the invention. Device 20 comprises a well-type manometer 22 including a well 24 for retaining mercury 25, a vertically disposed hollow leg 26 in well 24 and extending upwardly exteriorly from well 24. Leg 26 includes a bore 27 communicable with mercury 25 in well 24 by means of an adjustably sized aperture 28 (FIG. 2) adjacent the base of well 24. Adjustment of the size of aperture 28, such as by means of a needle valve, provides for control of the flow of mercury 25 as it rises in leg 26 to prevent separation of the mercury column. The longer the length of leg 26 in a device 20, the smaller the size aperture 28 should be, and with shortening of the length of leg 26 in device 20, the less smaller an aperture is required.

An inlet port 30 is provided at the top of well 24 for introduction of air thereinto and upon the level of mercury 25 therein. Inlet port 30 is connected to a pneumatic line 32 through which air is introduced from a pressure producing source to pneumatic circuit 33 (FIG. 1) constituting a portion of device 20. A pneumatic line 34 connects line 32 to a normally open (N.O.) air solenoid valve 36 and a metering valve or flow regulator 38 connected in pneumatic parallel with valve 36. A pneumatic line 40 connects the bore of manometer leg 26 with a normally open (N.O.) air solenoid valve 42 with which a metering valve or flow regulator 44 is connected in pneumatic parallel. A pneumatic line 46 is connected to the juncture of, as it is now apparent, a pneumatic line 47 common to the manometer well 24 and leg 26 of the manometer, which juncture lies in line 47 between valves 36, 38 and 42, 44. The other end of pneumatic line 46 is connected to a sensing probe 48 mounted on a fixture 50. A normally closed (N.C.) air solenoid valve 52 is optionally disposed in line 46 for elimination of seepage of air through sensing probe 48 when device 20 is not being operated, as in some instances of use, valve 52 is useful for conserving air supply that otherwise would wastefully leak through probe 48.

Well 24 (FIG. 2) comprises a metallic cylinder 54 to which rigid top and base members 55, 56 are securely attached by suitable means such as threaded and nutted bolts 58 which tightly connect such members about the ends of cylinder 54 as shown. The lower end of leg 26 is seated in a recess 60 provided in base member 56 to support it, while its length extends upward through and exteriorly of top member 55. O-rings 61 are provided in respective grooves formed in recess 60 and hole 63 in base and top members 56, 55, respectively, for sealing off the bore of leg 26 at its lower end from mercury 25 other than through aperture 28, and for sealing off the interior of well 24 from atmosphere. O-rings 62 are provided at the rims of cylinder 54 along the inner circumference of the wall forming cylinder 54 whereby a sealed juncture is achieved between cylinder 54 and top and base members 55, 56, as shown, thereby providing for a completely sealed interior for mercury 25 in well 24.

Leg 26 (FIGS. 2, 3, 4, 5, 6) comprises generally a hollow member, along the length of which and in ascending manner exteriorly of well 24, a plurality of electrical leg contacts 65a, 65b . . . are mounted therealong, with a common electrical leg contact 65 being disposed below contact 65a. Contact 65 may be suitably attached to cylinder 54 for engagement with mercury at all times. FIGS. 3 to 5 illustrate a preferred mechanical construction for leg 26 and leg contacts 65a, 65b . . . An electrical terminal screw means 66, constituting substantially each leg contact 65a, 65b . . . is threaded through an insulating collar 68 frictionally mounted about a short section of metal tubing 26t at each end of which a non-electrical conducting fitting 70 (FIGS. 3, 4) is securely mounted by means of ferrules 71 and nuts 72. These connections (fitting, nuts and ferrules) are preferably formed of nylon. An electrical lead 74a, 74b . . . is attached, as shown in FIG. 3, to each leg contact 65a, 65b . . . respectively, and is connected to electrical circuitry 76 (FIG. 6) hereinafter more fully described.

The sum of the length of a metal tubing 26t and the interior dimension 73 of a fitting 70 is uniform from one contact position to the next, as it should be observed that mercury 25 striking the lower rim of each metal tubing 26t as it rises in manometer leg 26 will effectively conduct current from leg contact 65 to leg contact 65a, from leg contact 65 to leg contact 65b, etc.

The circuitries 33 and 76 are preferably assembled within an elongated housing including suitable mechanical supports for the elements illustrated in the drawing. For ease of assembly of a desired length of leg 26 to be utilized in a given device 20 and of the spaced leg contacts 65a, 65b . . . a metallic cylindrical hollow member 77 (FIG. 5) is insulatedly secured to the top 78 of such a housing, such as by an insulating grommet 79. At the end of member 77 exteriorly of top 78, a suitable tube fitting 82 is provided for connection to pneumatic line 40. At the end of member 77 interiorly of top 78, fitting 70 and its adjuncts 71, 72 (if necessary) are secured to member 77 in the manner described above. A set screw 83 is provided in grommet 79 for engagement with a point along the length of member 77.

Mercury 25 cooperates with common contact 65 and contacts 65a, 65b . . . to function as a switch as it meets each such point along leg 26 in its upward movement during operation of device 20. Common contact 65 is connected to one end of an electrical line 84 (FIG. 6) connected to the one end of the 6.3 v. A.C. half of a step-down transformer 86 whose other half is connected to a conventional 110 v. A.C. source via a plug 87. Connected to each contact 65a, 65b . . . through leads 74a, 74b . . . is a line 88a, 88b . . . respectively, in each of which lines a signal light 90a, 90b . . . respectively, is disposed. These contacts, lines, and light signaling means are connected in parallel relationship to each other, as a common line 92 connects lines 88a, 88b . . . to the other side of the 6.3 v. A.C. half of the transformer 86 via lines 94 and 95.

It should now be apparent that an electrical circuit means including leg contacts 65a, 65b . . . and signal lights 90a, 90b . . . provides for visual indication of the extent of rise of mercury 25 in manometer leg 26, or in other words, for showing the degree of pressure drop or transient pressure change at sensing probe or gauging orifice means 48 in a cycle in which an article 144 is tested, and which is an indication or determination of variation from a nominal dimension of article 144.

Suitable means such as a jack strip 96 is provided whereby a jack 97a, 97b . . . therein is electrically attached to each line 88a, 88b . . . respectively. Six jack plugs, 98–1, 98–2 . . . 98–6 are provided for electrical attachment to any six of the jacks 97a, 97b . . . for and in operation of device 20, purpose and effect of such particular attachments fully explained hereinafter. Each of the six jack plugs 98 is connected via their respective electrical lines to a switch in a holding relay 100–1, 100–2 . . . 100–6, respectively, and is also connected to the left end of each of the relay coils 102–1, 102–2 . . . 102–6, respectively, as shown in FIG. 6, corresponding to an operatively associated relay 100–1 . . . 100–6. The switching blade for each of such switches is further connected to a common line 104 which is connected via line 84 to the right end of the 6.3 v. A.C. side of transformer 86. A line 106 operatively corresponds to line 104 and extends as a common line from line 94 (connected to line 95) to the right end of each of the relay coils 102–1 . . . 102–6. Thus, as mercury 25 reaches an electrical contact 65a, 65b . . . in leg 26 with a jack plug 98–1, 98–2 . . . engaging a jack 97a, 97b . . . attached to a line 88a, 88b . . . the corresponding coil 102–1, 102–2 . . . is initially enregized, and its associated relay switch is flipped whereby line 104 is connected to the left end of such coil, thereby maintaining energization thereof. Furthermore, when mercury 25 returns to its static condition in leg 26, the signal lights 90a, 90b . . . in the lines 88a, 88b . . . which do not have connected therewith any jack plug 98, are extinguished. The signal lights 90a, 90b . . . in those lines 88a, 88b . . . into which jack plugs 98 have been inserted into jacks 97a, 97b . . . remain illuminated. All relay coils 102 remain energized and their corresponding relay holding switches can be returned to their non-actuated positions only be depressing a normally closed (N.C.) clear switch 110 disposed in line 84 which is connected to line 104.

It should now be apparent that an electrical circuit means including jack plugs operatively connected to jacks, energizing coils and associated relay switches therewith, and certain signal lights in the particular circuits including the jacks and jack plugs, provides for retention or recordation of results of a test on an article 144 in a cycle, as will be more fully understood by a reading of the operation of device 20 hereinafter.

The actuation of normally closed (N.C.) clear switch 110 eliminates all energization to both 110 and 6.3 voltage circuits of electrical circuitry 76 in device 20. Switch 110 is actuated to prepare for each test cycle by de-energizing all electrical components in both voltage circuits. Clear switch 110 is disposed in both hot lines 84 and 112 of the 6.3 v. and 110 v. circuits, respectively, from transformer 86. A normally open (N.O.) start switch 114 in hot line 112 is momentarily closed for initiation of a testing cycle on article 144. A holding switch 116 in a master relay unit 118 includes a by-pass line 120 through which current flows when holding switch 116 is actuated upon closing of start switch 114, as coil 121 in master relay unit 118 is and remains energized. Current in hot line 112 continues to flow to a closed switch 122 in a relay unit 123, to a line 124 and thence to a closed relay switch 126 in a timer mechanism unit 128. Switch 126 in turn is connected to a line 130 that is connected to the coil of normally closed (N.C.) air solenoid valve 52. Consequently, valve 52 is energized and is opened upon closing of start switch 114.

A common line 132 to air solenoid valves 36, 42, 52 provides potential power thereto upon energizing the entire electrical circuitry 76 of device 20 by means of a toggle switch 133. A pilot lamp 134 is shunted across the 110 v. A.C. lines leading to transformer 86 for indicating supply of electrical power to device 20 prior to actuation of start switch 114.

As a result of energization of the coil of master relay unit 118, another normally open switch 134 therein closes, thereby establishing energization of the following 6.3 v. circuit: lines 84 and 104, the 6.3 v. closed switch opposing coil 102–1, a line 136 to closed switch 134, a line 138 to a signal light 140, and thence via a line 141, lines 92, 94 and 95. Illumination of signal light 140 occurs upon depressing start switch 114. Light 140 de-energizes when mercury 25 reaches a level in manometer leg 26 corresponding to the operative connection between jack plug 98–1 and a leg contact 65a, 65b . . . as coil 102–1 causes relay switch 100–1 to flip and break the circuit to light 140 through lines 136 and 138. Thus, mere illumination of light 140, with no de-energization thereof, indicates that mercury 25 did not reach the leg contact operatively connected to jack plug 98–1 during a cycle.

Upon depressing start switch 114, timer unit 142 is activated. It should be understood that timer unit 142 is optionally included in the preferred embodiment, as its purpose is for time delay of the actual testing on an article 144 (FIG. 1) mounted in fixture 50 having an air cavity 146 therein which must be pressurized before the testing cycle begins. Fixture 50 may or may not include a cavity 146, depending upon the fixture's construction and the nature of the article being tested by loss of air through open sensing probe 48. In other words, timer unit 142 is included in device 20 when such a cavity 146 is constructed in a fixture 50 and which is to be filled with air before the dynamic pneumatic system of device 20 tests article 144. In a fixture where a cavity 146 is not present, timer unit 142 need not be included in device 20.

The respective coils of timer units 128, 142 are connected, through their respective timing mechanisms (TIMER), to common line 132 on the one hand. The other end of the coil in timer unit 142 is connected to hot line 112 via a line 147. The other end of the coil of timer unit 128 is connected via a line 149 to an open relay switch 150 in timer unit 142. When a second switch 154 in timer unit 142 closes, current is supplied through a line 155 for closing normally open solenoid valve 36. When switch 150 closes, current from line 112 is fed via line 149 to the coil in timer unit 128.

When relay switches 126 and 153 in timer unit 128 flip from their positions shown in FIG. 6 to their alternative positions, the following circuits are established: closing of relay switch 153 provides for flow of current via a line 156 from a full wave bridge rectifier 158 shunted across lines 84 and 95 in the 6.3 v. A.C. circuit of transformer 86 into a line 159 connected to a closed second relay switch 160f in relay unit 100–6, and from there through lines connected to closed second relay switches 160e . . . 160a in corresponding relay units 100–5, 100–4 . . . 100–1, respectively, and thence to a line 190 connected to an additional system 164 symbolized at [164a, 164b, 164c . . . ], further described hereinafter.

Flipping of switch 126 to its alternate position provides for flow of current through a line 168 to a line 170 to close normally open air solenoid valve 42, as it will be observed that current flows from hot line 112 through closed relay switch 122 to line 124 and switch 126.

Flipping of switch 154 in timer unit 142 provides for flow of current to air solenoid valve 36 for closing same in pneumatic leg 34.

Mechanism unit 142 is an adjustable electronic time delay relay device whereby relay switches 154 and 150 are delayed in flipping to their alternate positions, while cavity 146 fills with air to effect a completed pneumatic system. After unit 142 times out, current flows through line 149 from switch 150 to the left side of the coil in timer unit 128, however, such coil is not immediately energized. Mechanism 128 is an identical unit to that of mechanism 142, and its coil is similarly energized upon an elapse of time after current flows to its left side. This is an important factor to remember as the description of operation of device 12 hereinafter is read and comprehended.

As to the pneumatic system during operation of device 20, pressure must be uniform throughout lines 34, 40 and line 46 to sensing probe 48 before actual testing or comparing an article 144 begins. In the event a cavity is provided in fixture 50, such pressure must also extend thereinto. Timer unit 142 provides for a sufficient time delay to assure existence of such a pressure condition in the cavity.

When unit 142 times out, air solenoid valve 36 closes, thus developing a pressure differential between lines 34 and 46 through orifice or metering valve 38. A pressure drop occurs in lines 46 and 40. Pressure increases in lines 34 and 32, which increase causes mercury 25 to rise in manometer leg 26 to a point where the pressure differential between lines 32 and 40 is compensated for.

The sensitivity of measuring a variation of a nominal dimension of article 144 by device 20 is increased with closing of metering valve 38 to a theoretical point of complete closure. Thus, adjustment of metering valve 38 assists in determining the overall length of movement for mercury 25 desired in manometer leg 26, as it will be shown in the following description of the operation of device 20. The greater the range of distance over which mercury 25 rises in manometer leg 26, the finer a measurement of a variation from a nominal dimension is available for visual or other reading from device 20.

OPERATION

An article 144 is first positioned in fixture 50. On-off switch 133 is closed, with pilot lamp 134 illuminating to show that power from electrical source at plug 87 is transmitted to transformer 86 and its 110 v. A.C. and 6.3 v. A.C. sides. Potential is created along line 132 to the one side of the coils in master relay unit 118, timer units 142 and 128, and in valves 36, 42 and 52. Potential is created along line 84 to common leg contact 65 and through line 95 to rectifier 158, and through lines 94 and 106 to the right side of relay coils 102–1 . . . 102–6, as well as along line 106 to relay unit 123. Also, potential is created through line 92 to signaling means 90a, 90b . . . . Normally closed clear switch 110 is opened to clear all circuits, energized coils and relay switches in electrical circuitry 76, and to dispose air solenoid valves 36, 42, 52 in their normal unenergized positions. The mercury in manometer 22 is in a static or non-flowing condition. Start switch 114 is momentarily closed, thereby energizing master relay unit coil 121. Holding relay switch 116 is thereby closed. Start switch 114 opens, nevertheless, current by-passes switch 114 to flow along hot line 112. Light 140 illuminates.

At this instance of time, current flows through line 112 to switch 122 in relay unit 123, through line 124 to closed switch 126 in timer unit 128, and thence through line 130 for energizing the coil of solenoid valve 52, should such a valve 52 be in the system, thereby opening its valve in pneumatic line 46. Thus, air is admitted to sensing probe 48 and the cavity in fixture 50 should such a cavity exist. Air pressure has been admitted to well 24 through pneumatic line 32, and upon leg 26 through pneumatic lines 34, 47, 40, as valve 36 is open.

The coil of timer unit 142, after a time delay during which the cavity in fixture 50 about object 144 is filled with air, is then energized.

Switch 154 flips to cause current to flow through line 155 to energize the coil in normally open air solenoid valve 36, closing such valve 36, at which instance the actual testing or comparing on article 144 begins. A pressure drop occurs (from line pressure) on the downside of valve 36 and metering valve 38. Valve 42 remains open. Switch 150 flips to cause current to flow through line 149 to the left side of the coil in timer unit 128, however, such coil remains unenergized at this moment in time.

At this point in time, the pneumatic system is dynamic, with air leaking about article 144 in sensing probe 48, and mercury 25 no longer in a static or non-flowing condition.

As mercury 25 rises in manometer leg 26, it functions as a switch upon meeting each contact 65a, 65b . . . closing the 6.3 v. A.C. circuit for each respective signal means 90a, 90b . . . .

By way of illustration, all six jack plugs 98 are connected to their female counterparts 97a, 97b . . . , say, 97a, 97c, 97e, 97g, 97i, and 97k. As mercury 25 reaches leg contact 65a, signaling means 90a illuminates by establishment of the following circuit: line 84, mercury 25, contact 65a, line 88a, and lines 95, 94 and 92. Also, the following circuit is established: line 88a, jack 97a, jack plug 98–1, relay coil 102–1, and lines 106, 94 and 95. Thus, relay coil 102–1 is energized, thereby flipping its associated left and right relay switches in relay 100–1 to their alternate positions. With the left switch in its alternate position (over relay coil 102–1), light means 90 remains illuminated although mercury 25 falls below leg contact 65a at the termination of the testing cycle on article 144 in probe 48. However, light means 90b would not remain illuminated after mercury 25 fell therebelow at the termination of such testing cycle, because no one of the jack plugs 98 engages jack 97b whereby a circuit including light means 97b would remain established.

Although timer unit 128, as does timer unit 142, ultimately times out in any event after start switch 114 is momentarily closed to initiate a cycle, for purposes of illustrating a practical operation of device 20, it may be stated that the cycle for testing is terminated in one of two ways: by energization of relay unit 123 as a result of mercury 25 rising to a leg contact level associated with jack plug 98–6 in a given jack 97b, 97c . . . or by actuation of timer unit 128. Timer unit 128 times out under either one of two conditions: (1) when mercury 25 does not rise in leg 26 to the level of a contact, 65a, 65b . . . i.e., the lowest contact in leg 26 to which jack plug 98–1 is operatively connected via its associated jack 97a, 97b . . . respectively, in which case, light means 140 remains illuminated, or (2) when mercury 25 rises to a stationary level in leg 26 within a pre-set range of movement determined by the positions of jack plugs 98–1 . . . 98–6 operatively engaging jacks 97a, 97b . . . .

Energization of relay unit 123 occurs only on the high side for mercury 25 in leg 26, i.e., in the event rise of mercury 25 exceeds the last or highest leg contact 65b, 65c . . . to which jack plug 98–6 is operatively connected via its associated jack 97b, 97c . . . and which corresponds to one of two limits of tolerance desired for article 144 and provided for in the pre-set range of movement for mercury 25 in leg 26. As mercury 25 meets, say, leg contact 65k, with jack plug 98–6 engaging jack 97k, the coil in relay unit 123 is energized through a line 182 from jack plug 98–6. Such energization causes switch 122 to flip to its alternate position, causing the circuits including air solenoid valves 36 and 52 to open valve 36 and close valve 52, thus terminating the testing cycle on article 144. In other words, current in hot line 112 no longer flows through switch 122 to lines 124 and 130 connected to the coil in valve 52 nor through line 130 to switch 154 and line 155 connected to the coil in valve 36. However, normally open valve 42 closes as current from line 112 now flows through switch 122 into lines 168 and 170 to energize its coil. The closing of valve 42 provides for the functioning of metering valve 44 in parallel thereto to regulate the fall of mercury 25 in its return to well 24.

Should mercury 25 not rise to leg contact 65k, but remain at a stationary level within the pre-set range provided by the extremely positioned jacks 98 corresponding to leg contact 65a and 65k (in the example being illustrated) or does not rise to the level of leg contact 65a, timer unit 128 times out. As a result of such timing out, relay switches 153 and 126 therein flip. Thus, current flowing in line 124 does not flow through switch 126 to maintain energization of the coils in valves 36 and 52 which then return to their normally open and closed positions, respectively. However, current does flow through switch 126 to lines 168 and 170 connected to the coil in valve 42 for energizing same.

It follows that when timer unit 128 times out, ending the cycle, where mercury 25 never rises to the level of leg contact 65a, light means 140 remains illuminated. Relay switch 100–1 does not flip to break the circuit to light means 140. Where, say, the lowest level at which jack plug 98–1 is operatively connected to a leg contact is at contact 65b, and mercury 25 never reaches the level of contact 65b, or in other words, it does not rise to the lowest limit of a pre-set range of movement required for it to establish the fact that the variation from a nominal dimension on article 144 being tested lies within the desired tolerance, but rises to at least the level of contact 65a, light means 140 remains illuminated. Also, light means 90 below the light means 90b, 90c . . . i.e., whichever ones are not operatively connected to jack plug 98–1, would deenergize upon mercury 25 falling and returning to well 24.

To establish an ideal flow condition through sensing probe 48, the following calibration techniques may be employed.

Calibration is influenced and controlled by three factors generally. The amount of pressure supplied to the system or device 20 will regulate the length of movement of mercury 25 in manometer leg 26. The adjustment of metering valve 38 will cause change in position of the range over the length of leg 26. Lastly, the specific positioning of each of the jack plugs 98 utilized for the testing of electrical circuits will determine particular readout signals 90 within the pre-set range desired. It will now be apparent that combinations and adjustments of the above factors will provide for any linear result of flow of mercury 25 desired, in measuring the variation from a nominal dimension of article 144 with use of device 20. What calibration of device 20 does is to provide for testing of a given article 144 under given pressures for pneumatic system 33 over a linear range pre-selected along the length of leg 26 and indicated by a specific number of signal lights 90a, 90b ... which may be more or less than the total number of such signal lights disclosed in the embodiment shown in FIG. 6. Furthermore, such calibration is dependent upon the positioning of the pre-range crcuit means (98, 100, 102, generally) desired to be utilized, based on what numbers and positions of jacks 97 with plugs 98 are desired.

The pre-set range for movement of mercury 25 over leg 26 may be more or less than that suggested by the total numbers of leg contacts 65 and jacks 97 in device 20 and as described in the above example of operation. As a corollary, more or less than the total number of jack plugs 98 may be utilized in a given pre-set range as distinguished from use of those illustrated in the above example.

It should now be apparent that utilization of a greater than less number of leg contacts 65 provides for a larger number of readings obtainable from signaling means 90, and in effect, advantageously provide for determination of finer tolerances for an article 144 compared to a master article which establishes the nominal dimension to which article 144 is compared. For example, with use of a conventional probe 48, a tolerance of $2/10,000$ inch over the length of, say, a 30-inch manometer leg 26 is obtainable. With device 20:

a $1/10,000$ inch tolerance is readable or obtained over a 30 inch length in leg 26;

a $1/100,000$ inch tolerance is readable or obtained over a 3 inch length in leg 26; and a $1/1,000,000$ inch tolerance is readable or obtained for a 0.300 inch length in leg 26.

It should now be seen that a greater number of readings corresponding to a larger number of leg contacts 65a, 65b ... per unit length, increases the sensitivity of device 20.

System 164, utilized in connection with devices external to device 20, comprises means for utilizing the results of a testing cycle. For example, an audio device responding to the readings provided by signaling means 90 may be connected to or constitute system 164. Device 20 may also be utilized for energizing systems such as computing, sorting, marking mechanisms, and any other requirements where dimensional readout is required.

In operation of device 20, system 164 is prepared for use during the testing cycle and thereafter is utilized after the testing cycle is terminated upon an article 144. The timing out of timer unit 128 alone controls the operation of system 164, regardless of unit 128 first timing out to terminate the testing cycle or mercury 25 first reaching the high side of the pre-set range of leg contacts 65b, 65c ... for terminating the testing cycle. In either event, unit 128 subsequently times out, and at this point the circuit to system 164 is established, and which is described as follows.

Current flows from rectifier 158 through line 156, switch 153, line 159, switch 160f, and thence through a bank of connected relay switches 160e, 160d, 160c, 160b and 160a to a line 190 connected to a load 164a in system 164. Each switch 160a, 160b ... in such bank is operatively associated with its corresponding coil 102–1, 102–2 ... operatively connected to a corresponding signaling means 90a, 90b. ... As each coil 102–1, 102–2 ... energizes as a result of mercury 25 rising to the leg contact operatively connected to such coil, the respective switch 160b, 160c ... flips to establish a current across a corresponding load 164b, 164c. ... By way of illustration, upon energization of coil 102–2, actuation of switch 160b establishes a circuit to a load 164c through line 192. At the same time, the circuit to load 164b is broken as flipped switch 160b no longer supplies current through a line 193 connected to flipped switch 160a connected to line 194 connected to load 164b. Thus, the result achieved in determining a variation from a nominal dimension of article 144 is advantageously utilized by the addition of system, load or external signaling means 164.

It should now be apparent that rectifier 158 is included for the purpose of producing a direct current (D.C.) signal through system 164, as a readout on signaling circuit means 90 occurs at the termination of a testing cycle. Such D.C. signal may be utilized for an audio device or other requirement such as mentioned above. Should it be desired not to include rectifier 158 in device 20, line 156 is connected directly to line 84 at the point where rectifier 158 is shown to be connected thereto in FIG. 6, and line 166 becomes in fact line 95.

It should be apparent that in the event additional timer unit 142 is not included in device 20, where no cavity is included in fixture 50 or where it together with air solenoid valve 52 is omitted, the efficient operation of device 20 is not affected. In either case, line 155, connected to air solenoid valve 36, is connected directly to switch 126 in timer unit 128 at the point where line 130 is connected to switch 126, rather than to omitted switch 154 in omitted timer unit 142; and line 149 is connected directly to hot line 112 rather than to omitted switch 150 in omitted timer unit 142.

Also, a non-automated version of device 20 may be constructed in the following manner. Timer unit 128 and 142 are omitted and air solenoid valve 42 is omitted. Line 155, connected to air solenoid valve 36, is now connected directly to, and in effect is, the same as line 112. Relay unit 123 is utilized in a different location, to the extent that normally closed switch 122 therein is relocated into line 120 as will become apparent hereinafter. Line 124 and extension of line 112 (to the right of line 200) to switch 122, it will be seen, are omitted. Relays 100–1 ... 100–5 and associated coils 102-1 ... 102–5 together with their corresponding jack plugs 98–1 ... 98–5 are also omitted, however, lines 104 and 106 continue to extend to coil 102–6 and to the coil in relay unit 123 associated with switch 122. Jack plug 98–6 or an equivalent electrical connection is fixedly attached to, say, jack 97p or other suitable connection in line 88p. Device 20 is calibrated such that should mercury 25 rise to the high side of manometer leg 26, i.e., to leg contact 65p during a cycle, the coil in relay unit 123 is energized, thereby flipping switch 122 therein to an open position. The circuit established in line 120 to master relay unit 118 is broken and the test cycle would be ended. After calibration, to the extent of a signal light, say, 90p, a test cycle is started. Start switch 114 is momentarily depressed. The operator visually inspects for the illumination of the plurality of signaling means 90 for determination of the extent of rise of mercury 25 in manometer leg 26. Should mercury 25 rise to a stationary level of, say, light means 90k, light means 90k is the last light to become illuminated. This visual inspection informs the operator whether variation from nominal dimension is within or without a desired tolerance. To prepare for the next cycle for testing, as is the case also in the heretofore described embodiments and operations thereof, clear switch 110 is momentarily depressed, de-energizing master relay unit 118, mercury 25 returning to well 24, and breaking the circuit including line 92 connected to light 140 and signaling circuit means 90. As mercury 25 falls below each leg contact 65k, 65j . . . its corresponding illuminated light means 90k, 90j . . . becomes extinguished light 90a being the last to be extinguished. Mercury 25 falls as a result of the closed pneumatic circuitry being opened, as valve 36 has returned to its normally opened position as a result of switch 122 in line 120 being opened.

It should be apparent from the above description that device 20 may be so constructed or calibrated to include any one of the leg contacts on leg 26 to correspond to the nominal dimension from which a variation from that dimension is determined by operation of such device.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. The invention may be practiced otherwise than as specifically described and exemplified herein, by those skilled in the art, and having the benefit of this disclosure.

Therefore, what I claim as patentably novel is:

1. A well and manometer leg combination for a manometer device comprising in combination:
   a hollow cylinder having opposing rims forming ends thereof,
   rigid top and base members securely mounted upon said ends,
   a vertically disposed tubular manometer leg mounted in said well and extending upwardly through a hole in and exteriorly of said top member,
   a recess in said base member for supporting the lower end of said leg,
   first O-rings mounted in grooves provided in the base member forming said recess and in the top member forming said hole for respectively sealing off said tubular leg from the interior of said well and the atmosphere,
   second O-rings mounted at said rims of said cylinder for cooperation with the secured top and base members, thereby sealing said well from the atmosphere,
   an inlet port for said well, and
   an aperture formed in said tubular leg adjacent said base member for introduction of well liquid into said leg upon application of pressure through said inlet port into said well.

2. The combination of claim 1 wherein the size of said aperture is adjustable for control of the flow of the liquid column into said manometer leg upon application of different pressures through said inlet port.

3. A pneumatic circuitry for determining variation from a nominal dimension of an article, comprising in combination,
   a manometer having its sides connectable to lines in a pneumatic system,
   a pneumatic system of lines comprising:
      (a) a first pneumatic line connected to the pressure side of said manometer and connectable to a pressure source,
      (b) a second pneumatic line connected to the sensing side of said manometer,
      (c) a third pneumatic line connecting said first and second lines,
   means forming a gauging orifice, said third pneumatic line connecting said gauging orifice means to said first and second pneumatic lines,
   a normally open solenoid valve mounted in said first pneumatic line,
   a metering valve in parallel relationship to said normally open valve, and
   a normally closed valve mounted in said third pneumatic line,
   whereby upon closing of said valve in the first pneumatic line and opening of said valve in the third pneumatic line after application of pressure to the pneumatic system, stabilization of said circuitry occurs upon rise of a liquid into the sensing side of said manometer in response to transient pressure change at said orifice gauging means, the rise in the sensing side of said manometer being indicative of such variation.

4. The pneumatic circuitry of claim 3 including:
   a normally open valve mounted in said second pneumatic line,
   a metering valve in parallel relationship to said valve in said second pneumatic line, said valve mounted in said second pneumatic line closing upon opening of said valve in the first pneumatic line.

5. A pneumatic circuitry for testing variation from a nominal dimension of an article, comprising in combination,
   a manometer for providing flow of a liquid into its sensing side upon pressure applied to its pressure side,
   a pneumatic system of lines comprising:
      (a) a closed loop for said manometer whereby upon pressure applied to the pressure side of the manometer, the liquid flows into the sensing side of said manometer,
      (b) means forming a gauging orifice about the article whose dimension is to be tested,
      (c) a pneumatic line connecting said gauging orifice means to said loop between the sides of said manometer,
   a normally open valve disposed in said loop between said pneumatic line and the pressure side of said manometer, and
   a metering valve in parallel relationship with said normally open valve, whereby upon closing of said valve upon application of pressure to the pressure side of said manometer, said circuitry becomes stabilized in responding to a transient pressure change at the gauging orifice, the rise of liquid in the sending side of said manometer being indicative of such variation.

6. The pneumatic circuitry of claim 5 including
   a normally closed valve mounted in said pneumatic line for elimination of waste of fluid seepage at the gauging orifice, said normally closed valve opening for a cycle of testing.

7. The pneumatic circuitry of claim 5 including
   a second normally open valve disposed in said loop between said pneumatic line and the sensing side of said manometer, and
   a metering valve in parallel relationship to said second normally open valve, said second valve closing upon terminating the cycle for testing.

8. The pneumatic circuitry of claim 7 including
   a normally closed valve mounted in said pneumatic line for elimination of waste of fluid seepage at the gauging orifice, said normally closed valve opening for a cycle of testing.

9. An electrical circuitry for starting and terminating a cycle for testing an article on which a variation from a nominal dimension is measured using a pneumatic system,
   comprising in combination,
   signalling means circuits for connecting to a manometer leg, said circuits being successively established by rising electrical conducting liquid in the manometer leg contacting successively disposed electrical connections for such circuits mounted to such leg,
   circuit means for pre-setting a range of movement of such liquid in such leg and being operatively connected to at least two of the circuits in said signalling means circuits,
   circuit means for terminating the cycle in the event the last of the two circuits in said signalling means circuits is established by the rise of such liquid in the manometer leg, said terminating circuit means being operatively associated with such last of the two circuits, circuit means adapted for connection to an air solenoid valve mounted in the pneumatic system for closing of said valve for starting the testing on the article, and a master relay unit for initiating the cycle for testing.

10. The electrical circuitry of claim 9 including:
a timer unit for terminating the cycle in the event the last of the two circuits in said circuit signalling means is not established as a result of the liquid not rising to the electrical connection on the manometer leg operatively connected to the last of such two circuits, said unit operatively connected to the coil of the air-solenoid valve to open it thereby ending the cycle of testing.

11. An electrical circuitry for starting and terminating a cycle for testing an article on which a variation from a nominal dimension is measured using a pneumatic system, comprising in combination,
signalling means circuits for connection to a manometer leg, said circuits being successively established with the use of rising electrical-conducting liquid in such leg contacting successively disposed electrical connections for such circuits mounted to such leg,
a first circuit for controlling a first normally open air solenoid valve in the pneumatic system,
a master relay unit for initiating the cycle, and means for energizing said master relay unit, whereby
  (a) said first air solenoid valve is placed in a closed position, whereby the pneumatic system becomes dynamic with such liquid flowing into such leg,
  (b) at least one of said signalling means circuits being established as such liquid flows into such leg,
  (c) the signalling means in said circuits providing for a visual readout corresponding to the variation from a nominal dimension on the article, and
  (d) the liquid rising and becoming stationary at a point along such leg.

12. The electrical circuitry of claim 11 including:
a circuit means for de-energizing said master relay unit in the event the last of said signalling means circuits is established by the rise of such liquid in such leg, said de-energizing circuit means being operatively associated with the last of said signalling means circuits and master relay unit.

13. The electrical circuitry of claim 11 including:
a timer unit for terminating the cycle in the event the last of said signalling means circuits is not established as a result of such liquid not rising to operatively cooperate with the electrical connection on the manometer leg corresponding to the last of said signalling means circuits,
said timer unit operatively connected to the coil of said first air solenoid valve to open it thereby ending the cycle of testing.

14. The electrical circuitry of claim 13 including:
circuit means for terminating the cycle in the event the last of said signalling means circuits is established by the rise of liquid in the manometer leg prior to actuation of said timer unit, said terminating circuit means being operatively associated with such last of said signalling means circuits.

15. The electrical circuitry of claim 14 including:
circuit means for pre-setting a range of movement of the liquid in the manometer leg, the last of which presetting circuit means being operatively connected with the last of said signalling means circuits, whereby upon rising of such liquid in such leg to a level corresponding to the last of such electrical connections operatively connected to the last of said signalling means circuits, said terminating circuit means terminates the cycle.

16. The electrical circuitry of claim 15 including:
means operatively connected to said pre-setting circuit means, being operable upon termination of the cycle, for utilizing the results of the completed test on the article in a system external to said device.

17. The electrical circuitry of claim 16 including:
rectifying means for producing a D.C. signal for use with the external system such as an audio device or other device.

18. The electrical circuitry of claim 14 including:
a second circuit for controlling a second normally open air solenoid valve in the pneumatic system, said second valve placed in a closed position upon termination of the cycle.

19. The electrical circuitry of claim 18 including:
circuit means for pre-setting a range of movement of the liquid in the manometer leg, the last of which presetting circuit means being operatively connected with the last of said signalling means circuits, whereby upon rising of such liquid in such leg to a level corresponding to the last of such electrical connections operatively connected to the last of said signalling means circuits, said terminating circuit means terminates the cycle.

20. The electrical circuitry of claim 19 including:
means operatively connected to said pre-setting circuit means, being operable upon termination of the cycle, for utilizing the results of the completed test on the article in a system external to said device.

21. The electrical circuitry of claim 20 including:
rectifying means for producing a D.C. signal for use with the external system such as an audio device or other device.

22. An electrical circuitry for starting and terminating a cycle for testing an article on which a variation from a nominal dimension is measured using a pneumatic system, comprising in combination,
signalling means circuits for connection to a manometer leg, said circuits being successively established with the use of rising electrical-conducting liquid in such leg contacting successively disposed electrical connections for such circuits mounted to such leg,
a first circuit for controlling open and closed positions of a first normally open air solenoid valve in the pneumatic system,
a master relay unit for initiating the cycle,
means for energizing said master relay unit,
a first timer unit for terminating the cycle in the event the last of said signalling means circuits is not established as a result of such liquid not rising to operatively cooperate with the electrical connection on the manometer leg corresponding to the last of said signalling means circuits, said timer unit operatively connected to the coil of the first value to open it thereby ending the cycle of testing,
a circuit means for terminating the cycle in the event the last of said signalling means circuits is established by the rise of liquid in the manometer leg prior to actuation of said timer unit, said terminating circuit means being operatively associated with such signialling means circuits for connection to a manom-
a second circuit for controlling open and closed positions of a second normally open air solenoid valve in the pneumatic system, said circuit closing the second valve upon termination of the cycle,
a third circuit for controlling open and closed positions of a third normally closed air solenoid valve in the pneumatic system, said third circuit being operatively connected to said master relay unit whereby the third valve opens upon energizing of said master relay unit thereby providing for flow of fluid to a gauging orifice means in the pneumatic system, and
a second timer unit for delaying the actual testing of the article until such fluid flows into a cavity provided in the gauging orifice means, said first normally open valve not closing until said second timer unit times out, said first timer not being activated until said second timer unit times out.

23. The electrical circuitry of claim 22 including:

circuit means for pre-setting a range of movement of the liquid in the manometer leg, the last of which pre-setting circuit means being operatively connected with the last of said signalling means circuits, whereby upon rising of such liquid in such leg to a level corresponding to the last of such electrical connections operatively connected to the last said signalling means circuits, said terminating circuit means terminates the cycle.

24. The electrical circuitry of claim 23 including:

means operatively connected to said pre-setting circuit means, being operable upon termination of the cycle, for utilizing the results of the completed test on the article in a system external to said device.

25. The electrical circuitry of claim 24 including:

rectifying means for producing a D.C. signal for use with the external system such as an audio device or other device.

26. A device for determining variation from a nominal dimension in an article comprising in combination, a pneumatic system including:
  (a) a manometer having a leg through which an electrical-conducting liquid is displaceable,
  (b) a first pneumatic line connectable to a source of pressure connected to said manometer,
  (c) a second pneumatic line connecting said first pneumatic line to said leg,
  (d) means forming a gauging orifice,
  (e) a third pneumatic line connecting said second pneumatic line to said gauging orifice means, and
  (f) a normally open air solenoid valve mounted in said second pneumatic line between said first and third pneumatic lines,
  (g) a metering valve in parallel relationship with said valve, an electrical circuitry for controlling a cycle for testing such article by means of transient pressure change occurring at said gauging orifice means, and including
  (a) a plurality of electrical leg contacts insulatedly mounted at spaced intervals along said leg,
  (b) circuit means for closing said first air solenoid valve,
  (c) signalling means circuits including said leg contacts for signalling successively increasing liquid levels in said leg as pressure change occurs at said gauging orifice means,
  (d) a master relay unit for energizing said electrical circuitry whereby the cycle for testing begins, and
  (e) means for energizing said master relay unit, whereby variation from the nominal dimension of the article is observed from said signalling means circuits.

27. The device of claim 26 in which said electrical circuitry includes:

circuit means for de-energizing said master relay unit in the event the last of said signalling means circuits is established by the rise of such liquid in such leg, said de-energizing circuit means being operatively associated with such last of said signalling means circuits and master relay unit.

28. The device of claim 26 including:

a timer unit for terminating the cycle in the event the last of said signalling means circuits is not established as a result of such liquid not rising to operatively cooperate with the electrical connection on the manometer leg corresponding to the last of said signalling means circuits, said timer unit operatively connected to the coil of said first air solenoid valve to open it thereby breaking the pneumatic system being utilized for the cycle.

29. The device of claim 28 including:

circuit means for terminating the cycle in the event the last of said signalling means circuits is established by the rise of liquid in the manometer leg prior to actuation of said timer unit, said terminating circuit means being operatively associated with such last of said signalling means circuits.

30. The device of claim 29 including:

circuit means for pre-setting a range of movement of the liquid in the manometer leg, the last of which pre-setting circuit means being operatively connected with the last of said signalling means circuits, whereby upon rising of such liquid in such leg to a level corresponding to the last of such electrical connections operatively connected to the last of said signalling means circuits, said terminating circuit means terminates the cycle.

31. The device of claim 30 including:

means operatively connected to said pre-setting circuit means, being operable upon termination of the cycle, for utilizing the results of the completed test on the article in a system external to said device.

32. The device of claim 31 including:

rectifying means for producing a D.C. signal for use with the external system such as an audio device or other device.

33. The device of claim 26 including:

a second normally open air solenoid valve in said second pneumatic line, said second valve closing upon termination of the cycle, a metering valve in parallel relationship to said second valve, and a second circuit for controlling the open and closed positions of said second valve.

34. The device of claim 33 including:

circuit means for pre-setting a range of movement of the liquid in the manometer leg, the last of which presetting circuit means being operatively connected with the last of said signalling means circuits, whereby upon rising of such liquid in such leg to a level corresponding to the last of such electrical connections operatively connected to the last of said signalling means circuits, said terminating circuit means terminates the cycle.

35. The device of claim 34 including:

means operatively connected to said pre-setting circuit means, being operable upon termination of the cycle, for utilizing the results of the completed test on the article in a system external to said device.

36. The device of claim 35 including:

rectifying means for producing a D.C. signal for use with the external system such as an audio device or other device.

37. A device for determining variation from a nominal dimension in an article comprising in combination, a pneumatic system including:
  (a) a manometer having a leg through which an electrical-conducting liquid is displaceable,
  (b) a first pneumatic line connectable to a source of pressure connected to said manometer,
  (c) a second pneumatic line connecting said first pneumatic line to said leg,
  (d) means forming a gauging orifice,
  (e) a third pneumatic line connecting said second pneumatic line to said gauging orifice means,
  (f) a normally open first air solenoid valve in said second pneumatic line between said first and third pneumatic lines, (g) a metering valve in parallel relationship with said first valve, (h) a normally open second air solenoid valve in said second pneumatic line between the sensing side of said manometer and third pneumatic line, (i) a metering valve in parallel relationship with said second valve, (j) a normally closed third air solenoid valve in said third pneumatic line, an electrical circuitry for controlling a cycle for testing such article by means of transient pressure change occurring at said gauging orifice means, and including:

(a) a plurality of electrical leg contacts insulatedly mounted at spaced intervals along said leg, (b) circuit means for controlling open and closed positions of said first and second valves, (c) signalling means circuits including said leg contacts for signalling successively increasing liquid levels in said leg as pressure change occurs at said gauging orifice means, (d) a master relay unit for energizing said electrical circuitry whereby the cycle begins, (e) means for energizing said master relay unit, (f) a first timer unit for terminating the cycle in the event the last of said signalling means circuits is not established as a result of such liquid not rising to operatively cooperate with said leg contact corresponding to the last of said signalling means circuits, said timer unit operatively connected to the coil of said first valve to open it thereby ending the cycle of testing, (g) circuit means for terminating the cycle in the event the last of said signalling means circuits is established by the rise of liquid in the manometer leg prior to actuation of said first timer unit, said terminating circuit means being operatively associated with such last of said signalling means circuits, and (h) a second timer unit for delaying actual testing of the article until pneumatic fluid flows into a cavity provided in the gauging orifice means, said first valve not closing until said second timer unit times out, said first timer not being activated until said second timer unit times out.

38. The device of claim 37 including:

circuit means for pre-setting a range of movement of the liquid in the manometer leg, the last of which pre-setting circuit means being operatively connected with the last of said signalling means circuits, whereby upon rising of such liquid in such leg to a level corresponding to the last of said electrical leg contacts operatively connected to the last of said signalling means circuits, said terminating circuit means terminates the cycle.

39. The device of claim 38 including:

means operatively connected to said pre-setting circuit means, being operable upon termination of the cycle, for utilizing the results of the completed test on the article in a system external to said device.

40. The device of claim 39 including:

rectifying means for producing a D.C. signal for use with the external system such as an audio device or other device.

References Cited
UNITED STATES PATENTS

| | | | |
|---|---|---|---|
| 3,224,251 | 12/1965 | Minix | 73—37.5 |
| 2,845,791 | 8/1958 | Loxham et al. | 73—37.5 |
| 2,898,763 | 8/1959 | Jawett | 73—401 |

S. C. SWISHER, Primary Examiner

U.S. Cl. X.R.

73—401

PO-1050
(5/69)

UNITED STATES PATENT OFFICE
CERTIFICATE OF CORRECTION

Patent No. 3,555,882          Dated January 19, 1971

Inventor(s) Bernie E. Robinson

It is certified that error appears in the above-identified patent and that said Letters Patent are hereby corrected as shown below:

Column 14, line 56, "value" should read -- valve --;

line 62, after "such" insert -- last of said --;

line 63, "signialling" should read -- signalling --; insert a comma (,) after "circuits"; and delete "for connection to a manom-".

Signed and sealed this 11th day of May 1971.

(SEAL)
Attest:

EDWARD M. FLETCHER, JR.
Attesting Officer

WILLIAM E. SCHUYLER, J.
Commissioner of Patent